United States Patent [19]

Detable et al.

[11] Patent Number: 5,624,216
[45] Date of Patent: Apr. 29, 1997

[54] SCREW WITH A SHEARABLE HEAD, AND A TOOL FOR TIGHTENING SUCH A SCREW

[75] Inventors: Pascal Detable, Villedieu; Michel Andre; Fabienne Covello, both of Romorantin, all of France

[73] Assignee: Etablissements Caillau, Issy-les-Moulineaux, France

[21] Appl. No.: 584,557

[22] Filed: Jan. 11, 1996

[30] Foreign Application Priority Data

Jan. 17, 1995 [FR] France .................. 95 00440

[51] Int. Cl.$^6$ .................. F16B 31/00; F16B 33/04
[52] U.S. Cl. .................. 411/5; 411/3; 411/410
[58] Field of Search .................. 411/2, 3, 5, 410

[56] References Cited

U.S. PATENT DOCUMENTS

| | | |
|---|---|---|
| 3,444,775 | 5/1969 | Hills . |
| 3,595,124 | 7/1971 | Lindstrand .................. 411/5 X |
| 3,742,583 | 7/1973 | Devlin et al. . |
| 4,502,825 | 3/1985 | Yamada .................. 411/5 |
| 4,504,180 | 3/1985 | Ishii et al. .................. 411/5 |
| 4,948,312 | 8/1990 | Jochum .................. 411/5 |

FOREIGN PATENT DOCUMENTS

| | | |
|---|---|---|
| 228721 | 12/1943 | Switzerland . |
| 898026 | 6/1962 | United Kingdom . |
| 2060452 | 5/1981 | United Kingdom . |

Primary Examiner—Neill R. Wilson
Attorney, Agent, or Firm—Marshall & Melhorn

[57] ABSTRACT

A screw comprising, in succession between a first end and a second end thereof: a first polygonal head; a breakable neck; a second polygonal head; and a threaded shank; the diameter of the breakable neck being smaller than the diameters of the heads and of the shank, the screw further comprising a cylindrical bearing surface portion situated between the breakable neck and the second head, and having a diameter not less than that of the breakable neck, but less than that of the second head. A tool for tightening such a screw comprises a tightening endpiece including resilient means that project radially into the inside of the tube while they are in the free state, and that are capable of retracting to allow the first head of the screw to be inserted as far as the engagement portion of the tube and to co-operate with the cylindrical bearing surface portion of the screw when the first head thereof is in said engagement portion. The endpiece also includes a storage chamber suitable for containing at least one severed first head, and means for opening and closing said chamber.

3 Claims, 3 Drawing Sheets

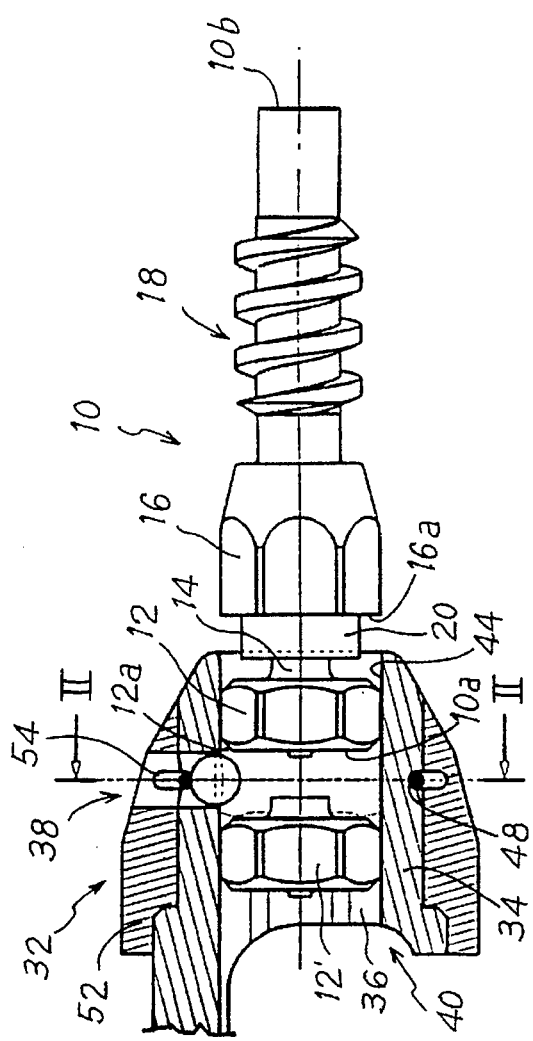
FIG_1
FIG_2
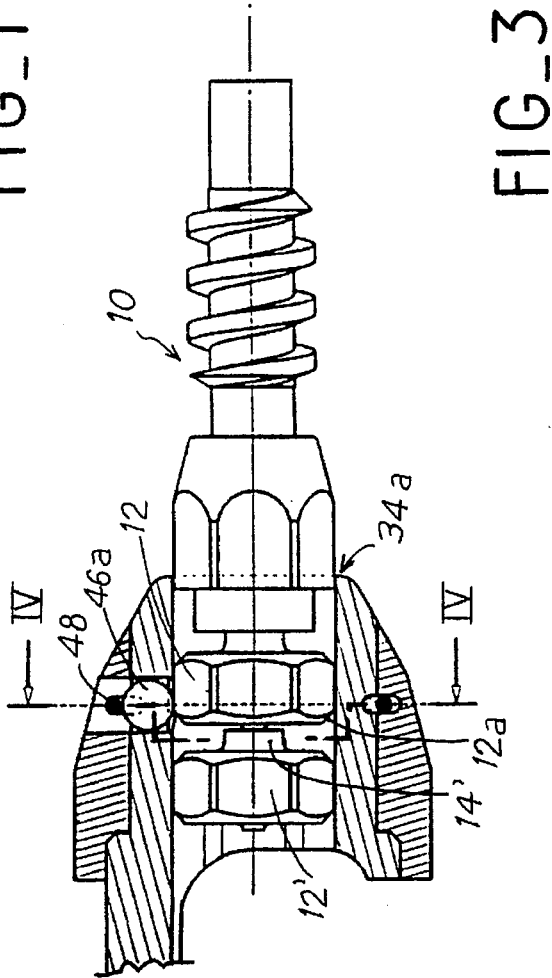
FIG_3
FIG_4

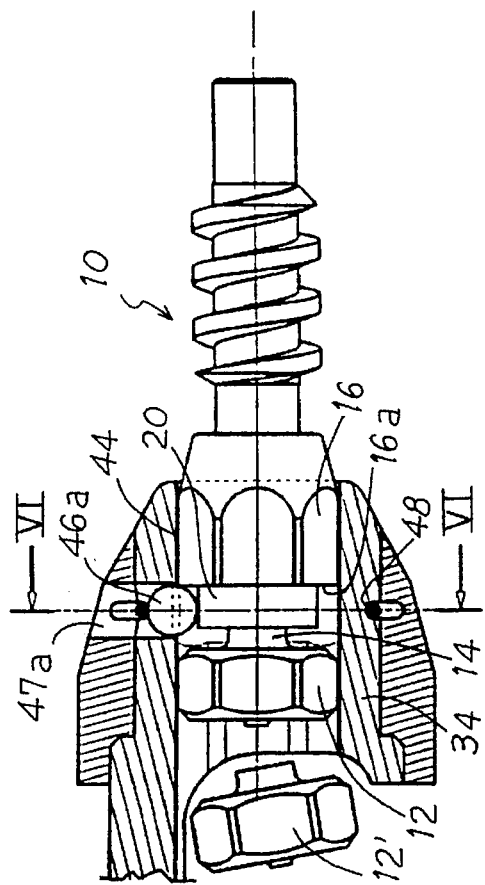
FIG_5
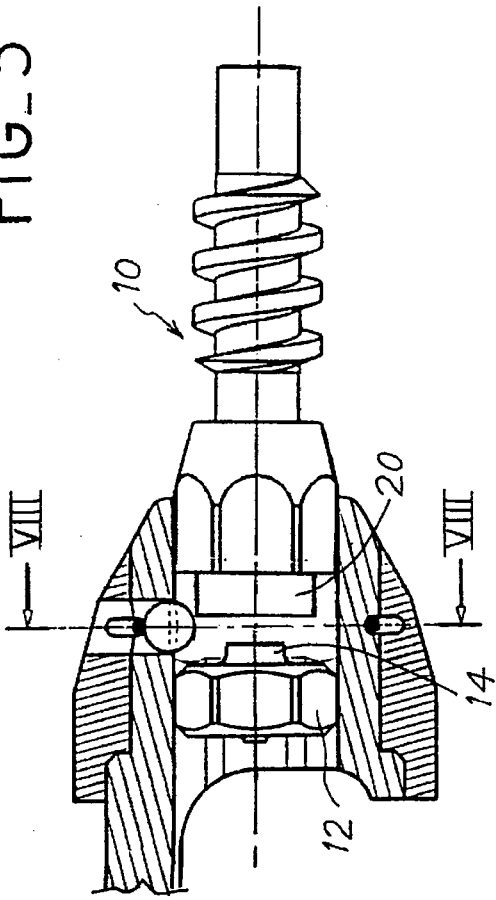
FIG_7
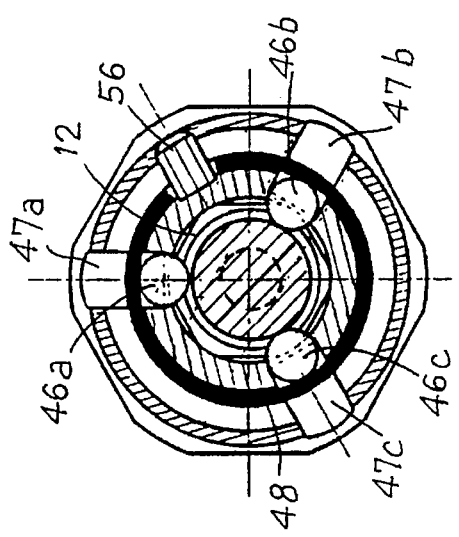
FIG_6
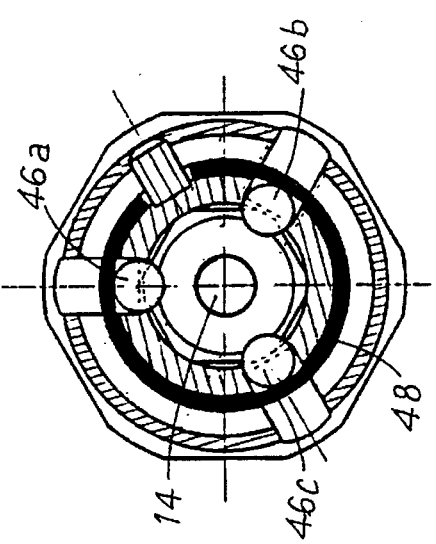
FIG_8

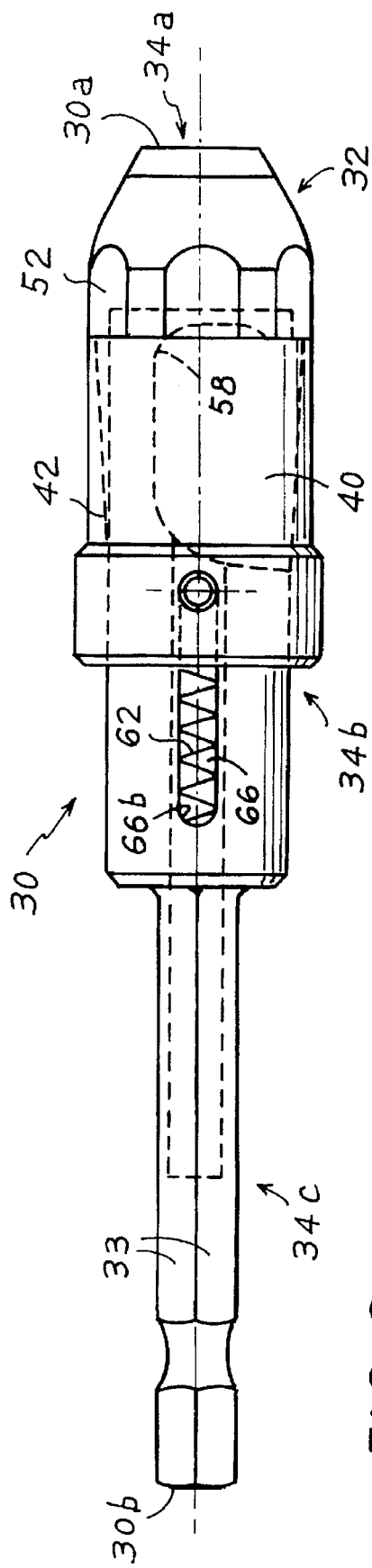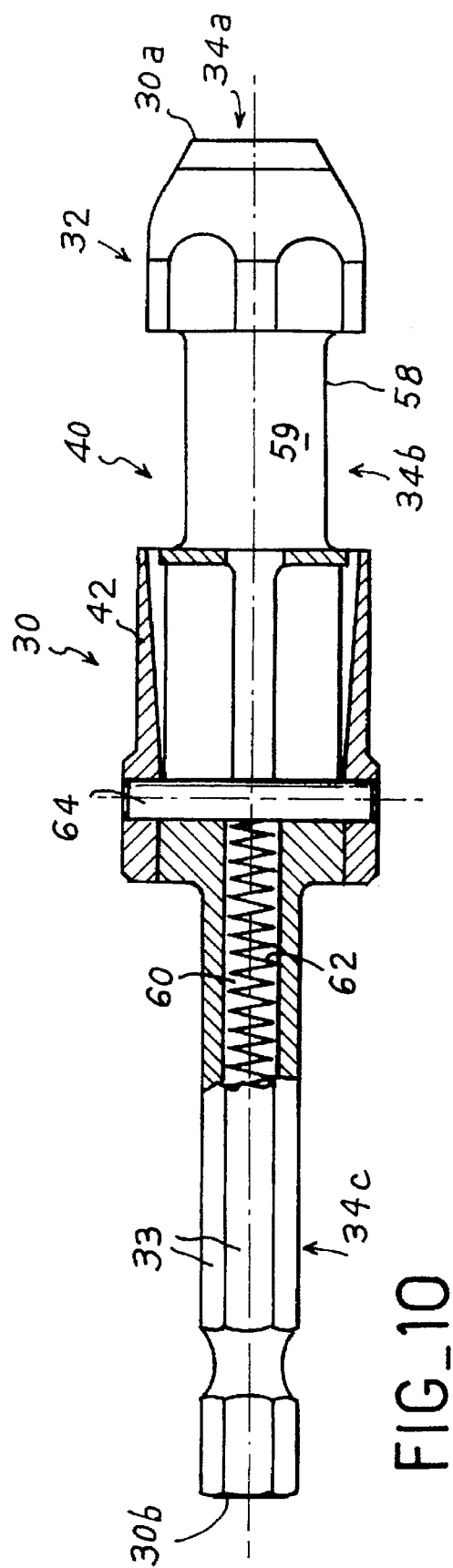

ves, when in the free state,
SCREW WITH A SHEARABLE HEAD, AND A TOOL FOR TIGHTENING SUCH A SCREW The present invention relates to a screw comprising, in succession between a first end and a second end thereof: a first polygonal head; a breakable neck; a second polygonal head; and a threaded shank; the diameter of the breakable neck being smaller than the diameters of the heads and of the shank.

BACKGROUND OF THE INVENTION

A screw of this type is already known, in particular from GB-A-898 026. The breakable neck is suitable for shearing during tightening, when the tightening torque reaches a predetermined value corresponding to the minimum diameter of the neck. The second head, which is closer to the shank, can nevertheless still be used to remove and optionally replace the screw.

Breaking of the neck, i.e. severing of the first head from the remainder of the screw, serves to avoid any excessive tightening.

When the first head is severed, nothing is provided to retain it, so it merely falls to the ground.

In particular because of the danger that might result therefrom, it is not acceptable for screw heads to be left lying on the floor of an assembly workshop, so workers regularly have to pick them up. The fact that these heads fall to the floor thus has the consequence of impeding and slowing down the work done.

OBJECT AND SUMMARY OF THE INVENTION

An object of the present invention is to remedy these drawbacks and to provide a screw of the above-specified type that has been improved to enable the first head to be recovered after the neck has sheared.

To this end the screw further comprises a cylindrical bearing surface portion situated between the breakable neck and the second head, and having a diameter not less than that of the breakable neck, but less than that of the second head.

The diameter of the cylindrical portion of the bearing surface is preferably greater than the diameter of the breakable neck.

Advantageously, the screw has a shoulder situated between the cylindrical bearing surface portion and the second head, while the free end of the first head has a substantially frustoconical portion flaring towards the breakable neck.

The invention also provides a tightening tool for tightening such a screw, the tool comprising a tightening endpiece and rotary drive means, the endpiece comprising a tube with inside diametral dimensions adapted to receive at least the first head of the screw, having a first end that opens towards the outside of the endpiece and including an "engagement" portion suitable for engaging the first head of the screw.

After the neck of the screw has sheared, present tightening tools do not prevent the severed head from falling to the ground, and thereby impeding workers.

The invention seeks to remedy this drawback.

To this end, the tightening tool includes resilient means disposed between the first end and the engagement portion of the tube, said resilient means, when in the free state, projecting radially into the tube and being suitable both for retracting to enable the first head portion of the screw to be inserted into the engagement portion of the tube and for co-operating with the cylindrical bearing portion of the screw when the first head thereof is inside said engagement portion.

The tool also includes a storage chamber and means for opening and closing said chamber, the chamber being connected to the engagement portion and being suitable for containing at least one severed first screw head.

Because of this structure, once the neck has been sheared, the severed first head remains engaged inside the tool and does not fall to the ground since the resilient means prevent it from escaping through the first end of the tube. When necessary, the worker can open the storage chamber and empty it out into a chosen receptacle.

BRIEF DESCRIPTION OF THE DRAWINGS

The invention will be well understood and its advantages will appear better on reading the following detailed description of an embodiment given by way non-limiting example.

The description refers to the accompanying drawings, in which:

FIGS. 1, 3, 5, and 7 are fragmentary longitudinal section views showing the first end of the endpiece of the tightening tool of the invention in four successive positions;

FIGS. 2, 4, 6, and 8 are cross section views respectively on II—II, IV—IV, VI—VI, and VIII—VIII of FIGS. 1, 3, 5, and 7;

FIG. 9 is a top view of the tightening tool of the invention with its storage chamber closed; and FIG. 10 is a partially cut-away elevation view of the FIG. 9 tool with its storage chamber in the open position.

MORE DETAILED DESCRIPTION

FIG. 1 shows a screw 10 which has a first end 10a and a second end 10b between which it presents in succession: a first polygonal head 12; a breakable neck 14; a second polygonal head 16; and a threaded shank 18.

The term "polygonal head" is used to cover any head whose radial periphery presents facets for co-operating with a tightening tool. In the example shown, the heads of the screw are hexagonal in section. They are preferably of the same diameter.

The breakable neck is a zone of weakness, suitable for being broken while the screw is being tightened via its first head 12, and its diameter is smaller than the diameters of the heads 12 and 16, and of the shank 18.

Between the breakable neck 14 and the second head 16, the screw includes a cylindrical bearing surface portion 20 whose diameter is greater than that of the breakable neck and less than that of the second head.

The function of this cylindrical bearing surface portion is explained below when describing the various stages of tightening the screw by means of the tightening tool of the invention.

The screw 10 has a shoulder 16a situated between the cylindrical bearing surface portion 20 and the second head 16. This shoulder 16a is located on the end of the head 16 that is the closer to the first end 10a of the screw. In contrast, the free end of the first head 12 has a substantially frustoconical portion 12a that flares towards the breakable neck 14.

The first head 12 of the screw is made in conventional manner, i.e. its free end 12a is slightly chamfered.

The tightening tool of the invention is now described, which tool is suitable for tightening the screw 10 by means of its first head 12 and for recovering the head so that it does not fall to the ground.

As can be seen in FIG. 9, the tightening tool 30 comprises a tightening endpiece 32 and rotary drive means 33. In the example shown, the rotary drive means are constituted by a plurality of facets formed on the end 30b of the tool remote from its end 30a at which the endpiece 32 opens out. Thus, the end 30b may be in the form of a bit of polygonal section suitable for cooperating with a conventional rotary drive tool of complementary shape. The tightening tool may be provided with any known means for imparting rotary drive.

As can be seen in FIG. 1, the endpiece 32 comprises a tube 34 of inside diametral dimensions adapted to receive at least the first head 12 of the screw. More precisely, the tube has a first end 34a that opens to the outside of the endpiece and that comprises in succession, starting from said first end: a cylindrical "guide" portion 44; resilient means 38; and an engagement portion 36 suitable for engaging the first head 12 of the screw.

The cylindrical guide portion 44 is in the form of a circular cylinder whose diameter corresponds substantially to the diameter of the circle circumscribing the second head 16 of the screw. The engagement portion 36 is generally prismatic in shape, being complementary to the shape of the first head of the screw and suitable for co-operating therewith.

The resilient means shown in the figures include at least one ball and a resilient member co-operating therewith. The tube includes at least one radial bore in which the ball is placed.

As can be seen in the cross section views, e.g. FIG. 2, three balls 46a, 46b, and 46c are placed in three respective radial cylindrical bores 47A, 47b, and 47c. These radial bores pass right through the tube 34. Their inside ends 47'a, 47'b, and 47'c situated adjacent to the inside periphery of the tube 34 are smaller in diameter than the balls they contain.

When the resilient means are in the free state, the balls 46a, 46b, and 46c project radially into the tube 34 under drive from the resilient member 48 which keeps each ball in abutment against the inside end edge of the bore in which it is placed.

The bores are generally in the form of cylinders having a diameter that is not less than the diameter of the balls. Only their inside ends are smaller so as to prevent the balls from escaping into the tube. The diameter at the end of each tube is only slightly smaller than the diameter of the balls so that when the balls are in abutment against the edges of said inside ends under drive from the resilient member, they project into the tube.

The outside periphery of the tube 34 has an annular groove 50 (clearly visible in FIG. 4) into which the radial bores open out. The resilient member 48 is constituted by a split ring disposed in this annular groove and it is therefore in a position to have its diameter increased resiliently so as to enable the balls to be retracted.

The tube 34 is covered by a sleeve 52 which protects the balls and the split ring. To enable the ring to increase in diameter, the inside periphery of the sleeve has an annular groove 54 facing the groove 50. The sleeve 52 is fixed to the tube by means of a screw 56 which passes through the grooves 54 and 50, penetrates into the gap 49 in the split ring 48, and is screwed into the tube 34. The screw 56 thus also prevents the ring 48 from rotating and keeps its gap away from the radial bores, thereby ensuring that the balls cannot escape from the bores.

The tightening tool also includes a storage chamber 40, and means 42 for opening and closing the chamber. The storage chamber, the beginning of which can be seen in FIG. 1, is connected to the engagement portion 36 and is suitable for containing at least one severed first screw head.

The tube 34 extends from one end of the tightening tool to the other. It has an intermediate portion 34b situated between the engagement portion 36 and its second end 34c provided with the above-mentioned rotary drive means 33.

The storage chamber 40 is formed in the intermediate portion 34b which has a longitudinal opening 58. Only a fraction 59 of the wall of the tube 34 remains in the length provided with the opening 58. This fraction 59 constitutes a wall of the storage chamber 40. The storage chamber can be opened and closed by means of ring 42 mounted on the tube 34 to slide between a first position as shown in FIG. 9 in which it closes the longitudinal opening 58, and a second position as shown in FIG. 10 in which it disengages said opening.

The ring 42 is resiliently urged towards its first position. To this end, a length of tube situated between the storage chamber 40 and the second end 34c of the tube has an axial bore 60 in which a spring 62 is received. The spring is connected to a rod 64 passing diametrically through the ring and fixed thereto, which rod is free to move in a slot 66 in the tube. When the ring is in a first position, the spring is in an expanded position, thereby keeping the ring in abutment against the sleeve 52.

FIGS. 1 to 8 show the various stages in tightening the screw 10 by means of the tightening tool 30. In FIG. 1, it can be seen that the engagement portion 36 of the tube contains a first head 12' that has already been severed from a screw. In this situation, prior to insertion of the screw 10 as far as the engagement portion 36, the balls 46a, 46b, and 46c naturally occupy their free state positions where they project into the inside of the tube 34 and prevent the head 12' from escaping via the end 34a of the tube. FIG. 1 shows the screw 10 as it is beginning to be inserted into the tube, while it is merely engaged in the cylindrical guide portion 44.

Thereafter, as the screw continues to be inserted inside the tube, its first head 12 comes into contact with the balls and pushes them radially outwards, i.e. causes them to retract as it goes past, thus expanding the split ring 48. At this moment, the substantially frustoconical portion 12a of the head 12 acts as a ramp that co-operates with the balls.

The retracted position of the balls is shown in FIG. 3, and also in FIG. 4 which is a cross section on line IV—IV of FIG. 3 passing through the breakable neck 14' of the severed head 12', with the split ring 48 being shown in the expanded state.

As shown in FIG. 5, when the first head 12 of the screw penetrates into the engagement portion 36 of the tube 34, it pushes the severed first head 12' into the storage chamber 40. Axial advance of the screw into the tube is stopped when the shoulder 16a of the second head 16 comes into abutment against the balls. In this position the balls co-operate with the cylindrical portion of the bearing surface 20 and tightening can be performed in conventional manner until the breakable neck 14 breaks. While tightening is taking place, the first head is driven by the engagement portion 36, while the second head which is engaged in the guide portion 44, is merely guided with no tightening action being exerted thereon.

The cylindrical bearing surface portion 20 is smaller in diameter than the heads of the screw, so the balls are free, during tightening, to co-operate with said portion 20 while projecting into the inside of the tube, i.e. they take up a position, similar to that of their free state, in which they prevent the head 12 from escaping.

The fact of providing the cylindrical bearing surface portion 20 with a diameter greater than that of the breakable neck 14 serves specifically to ensure that the screw is severed at the join between these two elements. i.e. beyond the balls in the direction going towards the engagement portion of the tube.

FIGS. 7 and 8 show the end-of-tightening situation in which, after breakage of the neck 14, the screw 10 is withdrawn minus its first head 12 which remains captive in the tube 34, thereby replacing the head 12' of FIG. 1. When it is felt that the number of severed heads inside the storage chamber 40 makes it necessary to empty out the chamber, this operation can be done by moving the ring 42 to its second position, so as to disengage the opening 58. The spring 62 then contracts until the rod 64 comes into abutment against the edge 66b of the slot 66 situated adjacent to the rear end of the tube.

We claim:

1. A screw comprising, in succession between a first end and a second end thereof: a first polygonal head; a breakable neck; a second polygonal head; and a threaded shank; the diameter of the breakable neck being smaller than the diameters of the heads and of the shank, wherein the screw further comprises a cylindrical bearing surface portion situated between the breakable neck and the second head, and having a diameter not less than that of the breakable neck, but less than that of the second head.

2. A screw according to claim 1, wherein the diameter of the cylindrical bearing surface portion is greater than that of the breakable neck.

3. A screw according to claim 1, having a shoulder situated between the cylindrical bearing surface portion and the second head, while the free end of the first head has a substantially frustoconical portion flaring towards the breakable neck.

* * * * *